United States Patent [19]

Kasselmann

[11] 4,274,513
[45] Jun. 23, 1981

[54] DISC BRAKE AND ACTUATING LEVER THEREFOR

[75] Inventor: John T. Kasselmann, South Bend, Ind.

[73] Assignee: The Bendix Corporation, Southfield, Mich.

[21] Appl. No.: 23,929

[22] Filed: Mar. 26, 1979

[51] Int. Cl.³ .......................................... F16D 55/224
[52] U.S. Cl. .................................. 188/72.7; 188/71.9; 188/72.9; 188/196 BA
[58] Field of Search ................... 188/72.9, 72.6, 72.7, 188/72.8, 73.4, 71.8, 71.9, 196 BA, 72.2, 106 R, 140 A, 140 R, 70 B, 138, 24, 71.1

[56] References Cited

U.S. PATENT DOCUMENTS

| 3,422,933 | 1/1969 | VanHouse et al. | 188/140 A X |
| 3,664,469 | 5/1972 | Maurice | 188/72.9 |
| 3,677,375 | 7/1972 | Wolf | 188/138 |
| 3,882,971 | 5/1975 | Peckham, Jr. | 188/24 |
| 4,117,910 | 10/1978 | Johannesen | 188/71.9 |

Primary Examiner—Douglas C. Butler
Attorney, Agent, or Firm—Paul David Schoenle; Ken C. Decker

[57] ABSTRACT

A disc brake assembly includes a rotor and a pair of friction elements which are engageable with the rotor to retard rotation of the latter. A support carries the rotor and movably disposes the pair of friction elements adjacent the rotor. An actuator is pivotally mounted on the support and is provided with a cam member to urge the pair of friction elements into engagement with the rotor as the actuator moves from a neutral position to a braking position. The actuator includes at least one friction pad which is engageable with the rotor to move the actuator from the neutral position to the braking position. An input member on the actuator is operated by a vehicle operator to control the engagement of the one friction pad with the rotor. The actuator rotates about its pivotal mounting on the support and in the direction of rotation of the rotor when it moves from the neutral position to the braking position. A frame includes a central opening for carrying the pair of friction elements and an extendible assembly is carried within the central opening by a lever. The lever is adjustable by the extendible assembly to control the position of the pair of friction elements relative to the rotor.

3 Claims, 3 Drawing Figures

DISC BRAKE AND ACTUATING LEVER THEREFOR

BACKGROUND OF THE INVENTION

As is well known in the art, a disc brake assembly included a rotor which was rotatable with a wheel assembly. A pair of friction elements were engageable with the rotor to effectuate braking of the rotor. A caliper frame carried the pair of friction elements and an input lever or hydraulic motor was operable to move the pair of friction elements into engagement with the rotor. The hydraulic motor received pressurized fluid from a pressure source and a piston was movable in response to the pressurized fluid to move the pair of brake shoes into engagement with the rotor. When an input lever was used, the lever was positioned relative to the frame so as to create a fulcrum. Therefore, when the lever was moved by a vehicle operator, the fulcrum enabled the lever to move the pair of brake shoes into engagement with the rotor. Even with the fulcrum, the input force required of the vehicle operator was greater than desired.

SUMMARY OF THE INVENTION

The present invention relates to a disc brake wherein a pair of friction elements are to be urged into frictional engagement with a rotor. A support or axle assembly rotatably mounts the rotor and an actuator is pivotally coupled to the support. The actuator includes a cam member cooperating with the pair of friction elements to move the latter into engagement with the rotor when the actuator is moved from a neutral position to a braking position. In order to move the actuator to the braking position, a pair of friction pads which are carried by the actuator are engageable with the rotor so that the friction pads and actuator move with the rotor. With the actuator pivotally coupled to the support, the engagement of the friction pads with the rotor causes the actuator to pivot relative to a connection with the support so that the cam member pivots relative to the pair of friction elements to move the latter into engagement with the rotor.

A frame is slidably carried by the support so as to dispose the pair of friction elements on opposite sides of the rotor. One of the pair of friction elements opposes a roller and the frame carries another roller such that the cam member is disposed between the rollers. When the cam member moves relative to the rollers, the one friction element is moved in one direction while the frame is moved in an opposite direction. The frame includes a lever which carries the other roller and terminates in an extendible assembly offset from the other roller. A pawl is engageable with the cam member to control extension of the extendible assembly.

It is a primary object of the present invention to provide an actuator in a disc brake assembly which is rotatable by a rotor to move a pair of friction elements into engagement with the rotor.

It is another object of the invention to provide an extendible assembly which is adjustable to control the position of the pair of friction elements in response to rotation of the actuator.

DETAILED DESCRIPTION

Figure 1:
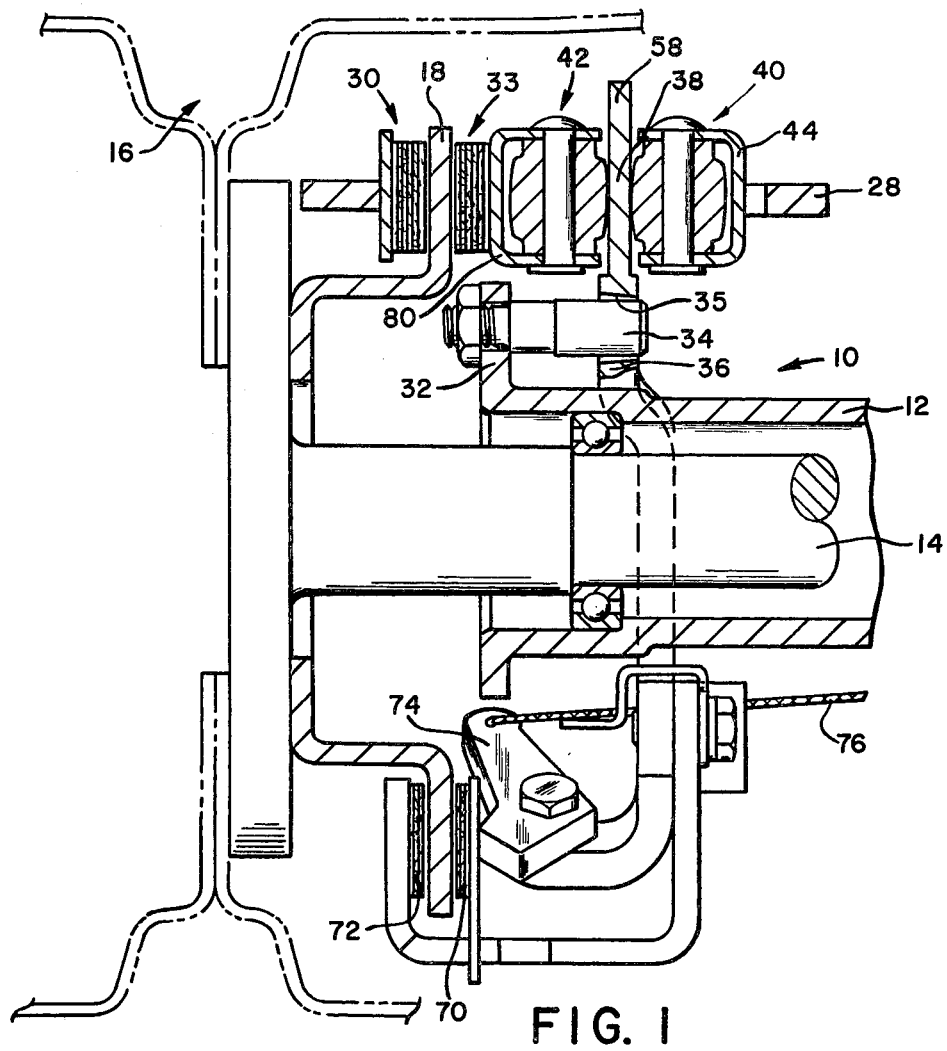
FIG. 1 is a cross-sectional view of a disc brake assembly constructed in accordance with the present invention.

In the disc brake assembly 10 shown in FIG. 1, an axle tube or support 12 rotatably receives an axle shaft 14 and the shaft couples to a wheel assembly 16. The shaft also carries a rotor or disc 18 such that rotation of the shaft and wheel assembly causes rotation of the rotor 18.

The support 12 defines a pair of radially extending arms 20 and 22 having respective guide surfaces 24 and 26. A caliper or frame 28 is slidably carried on the guide surfaces 24 and 26 and the frame movably carries a pair of friction elements 30 and 33, which are disposed on opposite sides of the rotor 18. The pair of friction elements are disposed within a central opening 29 having edges 31.

A flange 32 extends from the support 12 between the pair of arms 20 and 22 and a pin 34 is mounted on the flange. In accordance with the invention, an actuator 36 is pivotally supported on the pin 34. The actuator 36 terminates at one end in a cam member 38. The cam member is engageable with a pair of rollers 40 and 42 such that movement away from a neutral position causes the rollers to separate. As movement of the roller 40 is opposed by the frame 28, the roller 42 moves away from the roller 40 to urge the friction element 33 into engagement with the rotor 18 whereupon reaction forces acting on the frame 28 causes the latter to slide on the guide surfaces 24 and 26 to engage the friction element 30 with the rotor 18.

Figure 3:
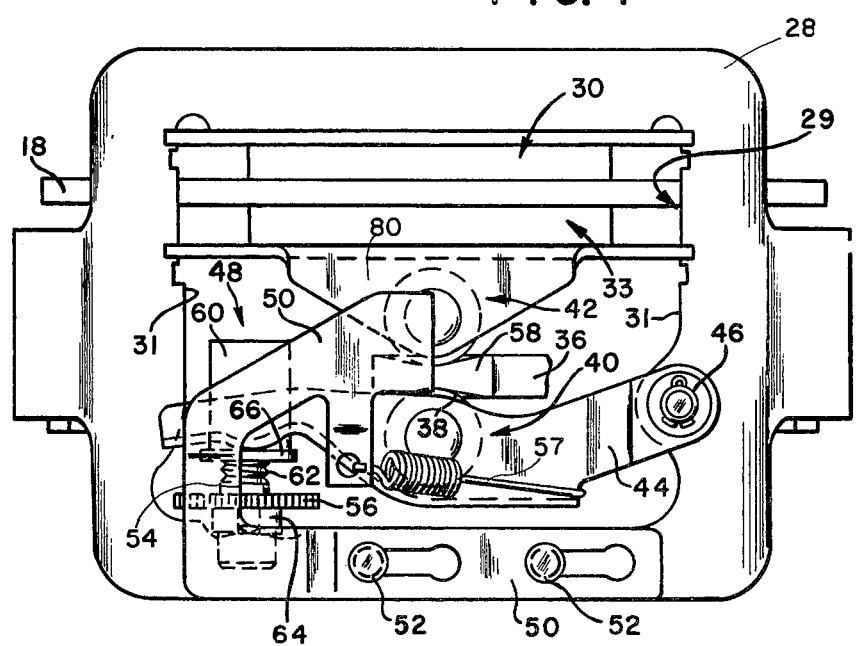
FIG. 3 is a top view of FIG. 2.

In particular the roller 40 is caged on an adjusting lever 44 which is pivoted to the frame 28 via pin 46, as shown in FIG. 3. The adjusting lever carries an extendible assembly 48 opposite the pin 46 and the extendible assembly is engageable with a pawl 50. The pawl 50 is slidably mounted on the frame 28 via pins 52 and is provided with an edge 54 which is engageable with a ratchet wheel 56 of the extendible assembly. A spring 57 extending from the lever 44 to the pawl 50 bias the latter against a tab 58 extending from the top of cam member 38.

The extendible assembly 48 includes a sleeve 60 secured to the end of lever 44. The sleeve 60 defines a bore for receiving a threaded stem 62 and the stem fixedly secures the ratchet wheel 56 thereto. A block 64 forms a slot to receive a portion of the frame 28 and an opening in the block receives a reduced diameter portion of the threaded stem 62. The sleeve 60 is formed with a flat surface 66 which engages the lever 44 to prevent rotation of the sleeve 60.

In order to pivot the actuator 36 about pin 34, a pair of friction pads 70 and 72 are carried at the end of actuator 36 remote from cam member 38. An input lever 74 is pivotally secured to the remote end of the actuator 36 such that movement of the input lever by a cable 76 causes the friction pads 70 and 72 to frictionally engage the rotor 18 at a location substantially opposite the pair of friction elements 30 and 33. When the friction pads 70 and 72 contact the rotor 18, the rotation of the rotor causes the actuator 36 to rotate with the rotor so as to pivot about pin 34.

Figure 2:
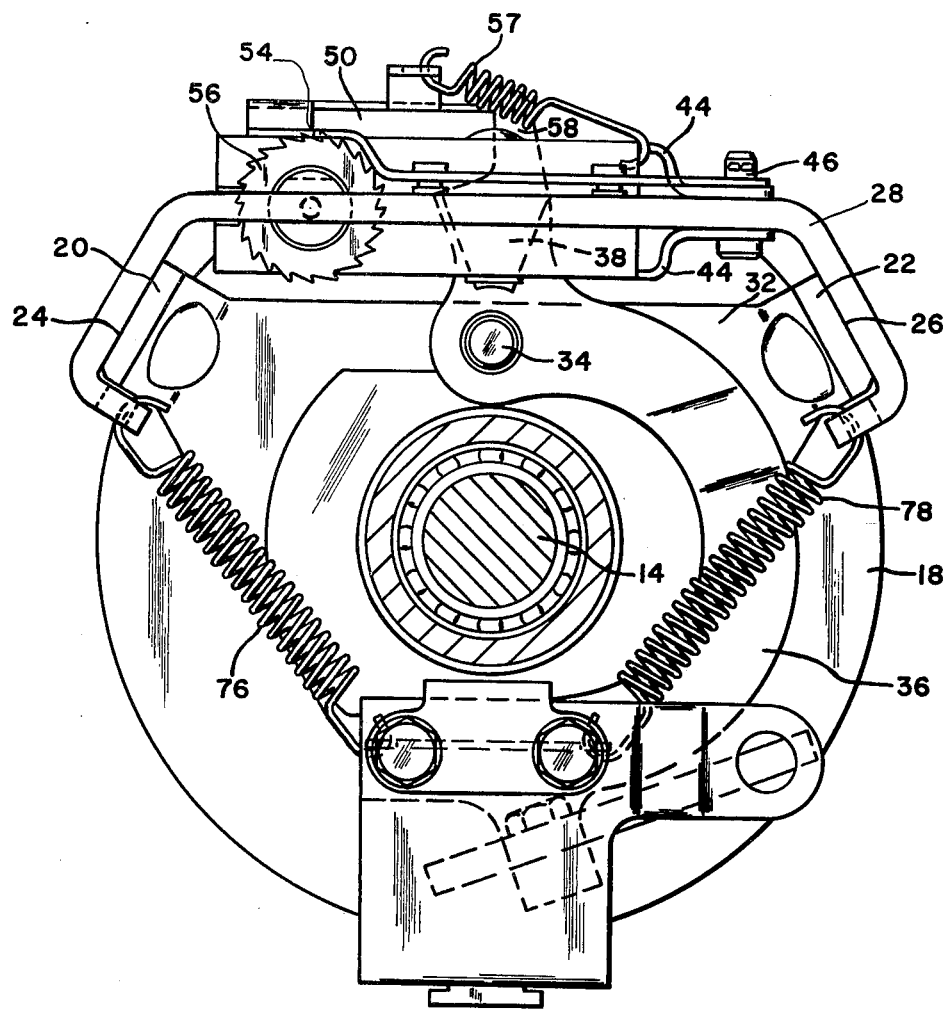
FIG. 2 is a right side view of the disc brake assembly shown in FIG. 1.

Viewing FIG. 2, the actuator 36 is arcuate in order to extend around the periphery of the axle tube 12. Moreover, there is sufficient clearance between the tube 12 and the actuator 36 to permit rotation of the latter in a clockwise direction. The actuator is biased to a neutral position by a pair of springs 76 and 78 extending from the remote end of the actuator to the frame 28.

MODE OF OPERATION

When the disc brake assembly 10 is operated, the cable 76 is pulled by a vehicle operator so that the lever 74 biases the friction pad 70 into engagement with the rotor 18. The tapered opening 35 which receives the pin 34 permits a slight amount of axial tilting for the actuator 36 so that the lever 74 causes the actuator to engage the friction pad 72 with the rotor. With both pads frictionally engaging the rotor, the actuator is rotated about pin 34 in the direction of the rotating rotor. The cam member 38 also pivots with the actuator to spread the rollers 40 and 42 apart. Consequently, the friction element 33 is directly moved into engagement with the rotor while the friction element 30 is moved into engagement with the rotor by the reaction of the frame 28 to move to the right in FIG. 1. Although the friction pads 70 and 72 retard the rotation of the rotor when in engagement therewith, it is the friction elements 28 and 30 which provide the majority of braking for the rotor 18.

Turning to FIG. 2, when the actuator 36 pivots about the pin 34, the tab 58 is moved to the right for clockwise rotation of the rotor or to the left for counterclockwise rotation of the rotor. The movement of the tab 58 causes the pawl 50 to slide to the right or left with the tab. Consequently, the edge 54 on the pawl is movable to impart rotation to the ratchet wheel 56. After successive brake applications, the friction linings of the pair of friction elements will wear so that further rotation of the actuator and increased movement of the tab will be necessary to effectuate braking of the rotor 18. This increased movement of the tab 58 causes the pawl edge 54 to index to successive teeth on the ratchet wheel. When the ratchet wheel 56 rotates, the sleeve 60 is biased away from the block 64 to pivot lever 44 towards the rotor 18. As a result, the roller 40 opposes the cam member 58 to adjust the position of the frame 28 relative to the guide surfaces 24 and 26. Moreover, the friction elements 28 and 30 are moved closer to the rotor 18 to take up the lining wear for the elements.

The extendible assembly 48 is offset within the central opening 29 so that the rollers and the extendible assembly will compactly fit within the central opening.

As illustrated in FIG. 3, the roller 42 may be caged in a plate 80 which forms the backing plate for friction element 33. It is also possible to cage the roller 42 in a plate which is separate from but in contact with the friction element 33.

I claim:

1. A disc brake assembly and actuator therefor comprising, in combination:
    a rotatable member rotating relative to a support;
    a frame movably carried by said support and including a central opening;
    a pair of friction elements disposed within said frame central opening and engageable with said rotatable member; and
    an actuator assembly extending into said frame central opening and cooperating with said frame and said pair of friction elements to bias the latter into engagement with said rotatable member as said actuator assembly moves from a neutral position to a braking position, said actuator assembly being pivotally mounted on said support substantially adjacent said pair of friction elements, said actuator assembly being engageable with said rotatable member substantially remote from said pair of friction elements such that said rotatable member moves said actuator assembly within said frame central opening from the neutral position to the braking position, said actuator assembly including a cam member and a pair of rollers, said frame central opening receiving said cam and said pair of rollers, and the movement of said actuator assembly causing said pair of rollers to separate from each other to bias said pair of friction elements into engagement with said rotatable member.

2. In an actuator assembly for a disc brake assembly having a support which is disposed adjacent a rotor to be braked, a frame movably carried by said support, said frame having a central opening for receiving a pair of friction elements and the actuator assembly being movably mounted on said support to bias said pair of friction elements into engagement with said rotor during a brake application, characterized by said actuator assembly comprising a lever extending into said central opening, said lever defining a cam which imparts movement to said frame and said pair of friction elements in reponse to movement of said actuator assembly, said lever including at least one friction pad which is engageable with said rotor at a substantially opposite location on said rotor than the location of engagement for said pair of friction elements to impart movement to said actuator assembly, and said support defining a tubular portion which receives an axle shaft and said lever extends from said mounting on said support to said one friction pad in an arcuate manner to partially circumscribe said tubular portion of said support.

3. The actuator assembly of claim 2 in which said support includes a pin extending outwardly therefrom and said lever includes an opening receiving said pin, said opening being tapered to permit said lever to tilt in a plane substantially perpendicular to said rotor.

* * * * *